UNITED STATES PATENT OFFICE.

SILAS M. YOUREE, OF BRADYVILLE, TENNESSEE, ASSIGNOR TO J. N. PATTON, W. H. YOUREE, AND F. Y. BEAVERS, ONE-FOURTH TO EACH.

REMEDY FOR HOG-CHOLERA.

SPECIFICATION forming part of Letters Patent No. 231,137, dated August 10, 1880.

Application filed March 10, 1879.

*To all whom it may concern:*

Be it known that I, SILAS M. YOUREE, of Bradyville, in the county of Cannon and State of Tennessee, have discovered a new Compound for Prevention and Cure of Hog-Cholera; and I do hereby declare that the following is a full, clear, and exact description of the same.

This invention relates to an improved composition of matter to be employed for the prevention and cure of hog-cholera; and it consists of three ingredients, to wit: antimony, spirits of turpentine, and kerosene or coal oil, combined in the proportions hereinafter set forth.

The ingredients composing my improved compound have been used heretofore separately, but without beneficial effect; and the gist of my invention consists in the compound composed of the three ingredients combined in the proportions hereinafter specified.

In carrying out my invention I employ the ingredients in the following proportions, viz: antimony, twenty pounds; spirits of turpentine, fifteen pints; coal-oil, five pints.

The above ingredients are thoroughly mixed in any convenient manner, forming the compound ready for use.

To administer the compound I have found it convenient to combine it with food, such as bran or cornmeal, in such proportions as to form a thick paste or dough of sufficient consistence to prevent the compound from settling or separating from the bran or meal. Other methods of administration, however, may be employed, and I therefore do not wish it to be understood that I claim any particular method of administration as a part of my invention.

The dose of the compound will vary according to the weight and age of the animal, generally about one ounce to a hog of seventy-five pounds weight for the first dose, the doses to be diminished successively in gradually-diminished quantities from time to time subsequently, as the nature of the case requires.

By the term "antimony," indicating one of the ingredients of my compound, is meant the sulphuret of antimony, or antimonii sesquisulphuretum of the United States Dispensatory.

Having thus fully described my invention, what I claim, and desire to secure by Letters Patent of the United States, is—

A composition of matter for the treatment of hog-cholera, consisting of antimony, twenty pounds; spirits of turpentine, fifteen pints; and coal-oil, five pints, combined substantially as herein specified.

SILAS M. YOUREE.

Witnesses:
W. R. McGINN,
S. E. PATTON.